United States Patent
Kuhn et al.

[11] 3,907,429
[45] Sept. 23, 1975

[54] METHOD AND DEVICE FOR DETECTING THE VELOCITY OF DROPLETS FORMED FROM A LIQUID STREAM

[75] Inventors: Lawrence Kuhn, Ossining; Robert A. Myers, New York; Keith S. Pennington, Somers; Bankim R. Shah, Croton-on-Hudson, all of N.Y.

[73] Assignee: International Business Machines Corporation, Armonk, N.Y.

[22] Filed: Aug. 8, 1974

[21] Appl. No.: 495,696

[52] U.S. Cl. ............. 356/28; 73/194 E; 250/222 R; 346/75
[51] Int. Cl.² G01P 3/36; G01F 1/00; G01D 21/04; G01D 15/18
[58] Field of Search ......... 250/222 R, 356; 324/175; 356/28; 346/75; 197/1 R; 73/194 E

[56] References Cited
UNITED STATES PATENTS

| | | | |
|---|---|---|---|
| 3,390,229 | 6/1968 | Williams | 250/222 PC |
| 3,600,955 | 8/1971 | Bischoff | 346/75 |
| 3,769,627 | 10/1973 | Stone | 346/75 |
| 3,787,882 | 1/1974 | Fillmore et al. | 346/75 |
| 3,852,768 | 12/1974 | Carmichael et al. | 346/75 |

OTHER PUBLICATIONS
Coburn et al., IBM Tech. Disc. Bulletin, Vol. 14, No. 11, 4-1972, p. 3544, 356-428.

Primary Examiner—Maynard R. Wilbur
Assistant Examiner—S. C. Buczinski
Attorney, Agent, or Firm—Frank C. Leach, Jr.

[57] ABSTRACT

Droplets from a liquid stream are directed between a pair of apertures and a light source, which is strobed at a selected frequency and directed toward the apertures. In one embodiment, the apertures are spaced less than a wavelength of the droplets apart and the light source is strobed at a frequency other than the frequency of the droplets. The time between when a first of the apertures is blocked by a droplet in the stream as indicated by the light being broken during a strobe and the time when a second of the apertures is blocked by another droplet when the light source is strobed is counted. This period of time will give the velocity of the droplets, and correction of the velocity is made, if the velocity of the droplets is not at the desired velocity, by changing the pressure, for example, of the manifold supplying the liquid stream until the desired velocity is obtained. In another embodiment, the apertures are spaced from each other a wavelength or an integral of the wavelength of the droplets, and the light source is strobed at the same frequency as the frequency at which the droplets are generated. The strobing frequency has its phase changed relative to the frequency of drop generation and the pressure of the stream changed until both of the apertures are blocked simultaneously. Any deviation from this indicates that the velocity of the droplets has changed and correction must be made.

14 Claims, 3 Drawing Figures

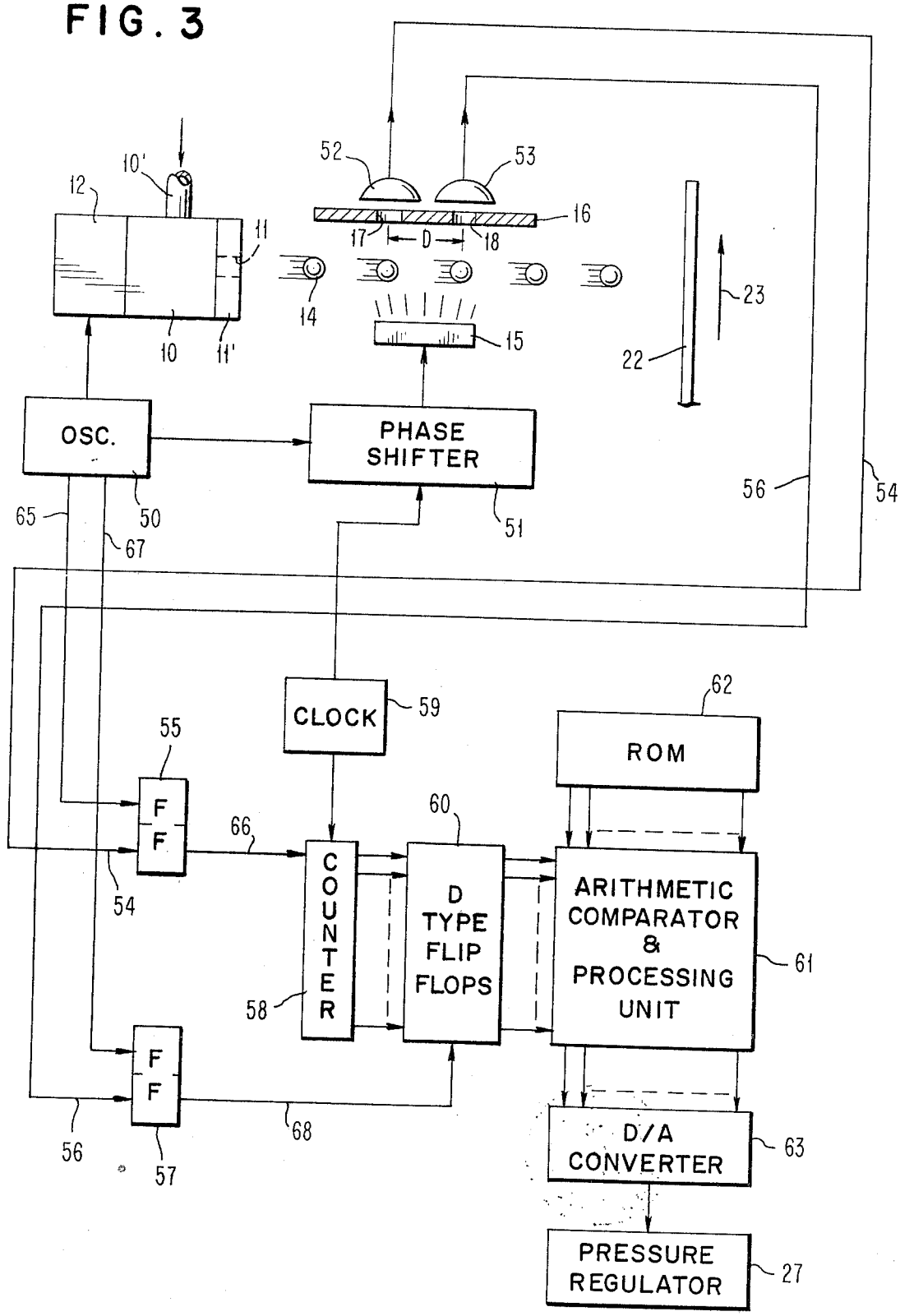

METHOD AND DEVICE FOR DETECTING THE VELOCITY OF DROPLETS FORMED FROM A LIQUID STREAM

In ink jet printing, a stream of ink is supplied under pressure and periodically perturbed so as to produce droplets, which impinge upon a suitable recording surface such as a sheet of moving paper, for example. To obtain printing on the paper by the ink in accordance with the desired pattern to be printed, each droplet must be directed to the recording surface or deflected therefrom prior to reaching the recording surface.

To control the ink droplets, various means of deflecting the ink droplets to produce a desired print pattern have been utilized. For example, in electrostatic ink jet printing, some of the droplets are given varying charge and others are not charged to control the print pattern. In magnetic ink jet printing, the droplets are not charged but are formed of a magnetic material with their deflection being produced by a magnetic field selectively applied to the droplets.

Since the deflection of the droplet in electrostatic or magnetic ink printing determines whether the droplet strikes the recording surface and where, the deflection of the droplet must be accurate. Since the deflection of the droplet is approximately inversely proportional to the square of its velocity, it is necessary that the velocity of the droplet remain substantially constant to obtain high quality printing.

In binary ink jet printing, each nozzle directs ink droplets to a specific spot for printing on the recording surface; the droplet is not charged if it is desired to print. If the spot is not to be used for printing, then the droplet is charged to deflect it to a gutter.

If an array of nozzles is used, it is necessary that the velocity of the ink jet from each of the nozzles be the same. Otherwise, the desired print pattern will not occur since the time of arrival variations will give rise to a printed line which is not straight.

Therefore, while the droplets in the binary printer are deflected by charging them, their deflection is not utilized to control where the droplet strikes the recording surface. Thus, in the binary printer, the velocity of each of the jets must be substantially uniform and be the same for the droplet to strike the desired portion of the recording surface.

Since the velocity can vary considerably when the droplet is subjected to different conditions such as a change in ambient temperature, for example, it is desired to know when the velocity of the droplet changes from its desired velocity so that correction can be quickly and automatically made. In electrostatic ink jet printing, the velocity can be determined by electrostatic induction. The temperature could be sensed to ascertain the velocity change when a droplet is not electrostatically charged as in magnetic ink jet printing or binary ink jet printing. However, the most precise determination of the velocity of the droplet is a direct measurement thereof.

The present invention obtains a direct velocity measurement of the droplets of an ink stream irrespective of whether the droplets have a charge or not. Thus, the method and device of the present invention may be readily utilized with any type of ink jet printing system to directly measure the velocity of the droplets.

The present invention obtains a direct velocity measurement of the droplets of an ink stream through utilizing a strobed light source and passing the stream of droplets between the strobed light source and a pair of apertures with light detecting means therebehind. Depending on the distance between the apertures, various means are employed for determining the velocity of the droplets in accordance with the relation of the droplets to the apertures during strobing of the light source.

An object of this invention is to provide a method and device for detecting the velocity of droplets formed from a liquid stream.

Another object of this invention is to provide a method and device utilizing a strobed light source for enabling the detection of the velocity of droplets formed from a liquid stream.

The foregoing and other objects, features, and advantages of the invention will be apparent from the following more particular description of the preferred embodiments of the invention as illustrated in the accompanying drawings.

In the drawings:

FIG. 3 is a schematic diagram showing another embodiment of the present invention for detecting the velocity of the droplets of a liquid stream.

Figure 1:
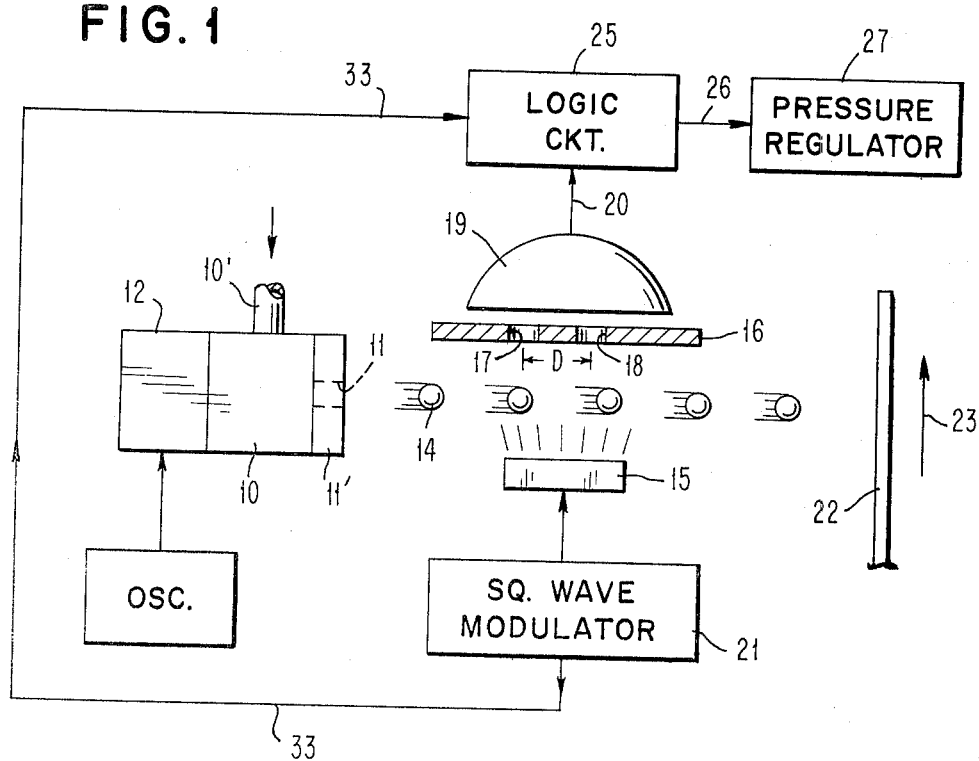
FIG. 1 is a schematic diagram showing one embodiment of the present invention for detecting the velocity of the droplets of a liquid stream.

Referring to the drawings and particularly FIG. 1, there is shown an ink manifold 10 to which ink from a reservoir (not shown) is supplied through a supply tube 10′. The manifold 10 has the ink supplied under pressure to supply the ink so that the ink flows from nozzles 11 (one shown) in a nozzle plate 11′ as a plurality of liquid streams.

The manifold 10 is vibrated at a selected frequency by suitable means such as a piezoelectric transducer 12. This causes each of the liquid streams from the ink manifold 10 to be broken up into droplets 14 having a selected wavelength.

The velocity of the liquid stream and the droplets 14 formed therefrom are related to the pressure of the ink within the manifold 10 and the area of the nozzle 11. Thus, if the pressure is increased, the velocity of the stream increases with the fixed area of the nozzle 11. A decrease in the pressure in the manifold 10 decreases the velocity of the liquid stream within the nozzle 11.

By selecting the frequency at which the transducer 12 vibrates the manifold 10 in conjunction with the velocity of the ink stream, the wavelength of the droplets 14 can be controlled. That is, $$V = f_1 w \qquad (1)$$

where $V$ is the velocity of the liquid stream and the droplets 14, $f_1$ is the frequency of the transducer 12, and $w$ is the wavelength of the droplets.

It is necessary for the velocity of the stream to remain constant for the droplets 14 to have the same wavelength. The droplets 14 must have a substantially constant wavelength to produce quality printing since each of the droplets 14 must be controlled to print or not print and in a selected area or spot on the recording surface. Thus, control of the velocity of the liquid stream and the droplets 14 is necessary to maintain the desired wavelength of the droplets 14.

If the velocity changes for any reason, than the wavelength changes since the frequency of the transducer 12 remains constant. Thus, it is necessary to correct the velocity to maintain the wavelength of the droplets 14 constant.

Therefore, for the droplets 14 to have a substantially constant wavelength, the velocity of the liquid stream and the droplets 14 must be monitored. Any change in the velocity requires correction of the pressure in the ink manifold 10 to correct the velocity.

To ascertain the velocity, the droplets 14 are directed in a path having light source means such as a light emitting diode (LED) 15, for example, on one side and a grid 16 on the other side. The grid 16 has a pair of apertures 17 and 18 formed therein at a distance D from each other.

A photodetector 19 is disposed behind the grid 16 and senses whenever the LED 15 is turned on. If one of the apertures 17 and 18 is blocked by one of the droplets 14, the output voltage of the photodetector 19 on its output line 20 will be less than if the apertures 17 and 18 are not blocked.

The distance D between the apertures 17 and 18 is less than the desired or selected wavelength $w$ of the droplets 14. Thus, only one of the apertures 17 and 18 is blocked at any time by one of the droplets 14.

The LED 15 is strobed at a selected frequency $f_2$, which is different than the frequency $f_1$ of the transducer 12. The LED 15 is strobed from a square wave modulator 21.

As the droplets 14 move along their path before striking a paper 22, which is moving in the direction indicated by an arrow 23, the aperture 17 of the grid 16 is blocked by one of the droplets 14. Depending on the relationship between the frequencies $f_1$ and $f_2$, one of the other droplets 14 will block the aperture 18 when the LED 15 is turned on at a later period of time. Accordingly, there is an apparent drift of the droplets 14 so that the drift velocity $V_d$ is given by $$V_d = \frac{V(df)}{f_2} \quad (2)$$

where $(df)$ is the frequency difference between the frequencies $f_2$ and $f_1$.

Since $f_2$ is the strobing frequency of the LED 15, it is known and does not vary. Similarly, $(df)$ is known and does not vary since the frequency $f_1$ also is a constant. Therefore, from equation (2), the shaft velocity $V_d$ can only vary as the velocity V of the droplets 14 varies.

When the velocity of the droplets 14 is at the desired velocity, the time between the blanking of the apertures 17 and 18 by the droplets 14 is a known value. Thus, if this velocity of the droplets 14 should change, the time between when the apertures 17 and 18 are blanked changes to indicate that the droplets 14 are no longer moving at the desired velocity.

Whenever either of the apertures 17 and 18 in the grid 16 is blocked by the droplet 14, the output of the photodetector 19 on the output line 20 decreases. This results in a signal being supplied to a logic circuit 25 to indicate that one of the apertures 17 and 18 is blocked by one of the droplets 14 at a time when the LED 15 is strobed on. When the other of the apertures 17 and 18 in the grid 16 is next blocked, the photodetector 19 supplies the reduced voltage on the output line 20 to indicate this to the logic circuit 25.

If the logic circuit 25 determines that the time between the blocking of the apertures 17 and 18 is not correct for the desired velocity of the droplets 14, a correction signal is supplied over an output line 26 to a pressure regulator 27. The pressure regulator 27 has the signal supplied thereto to adjust the pressure of the ink manifold 10 to return the velocity of the droplets 14 to the desired velocity.

Figure 2:
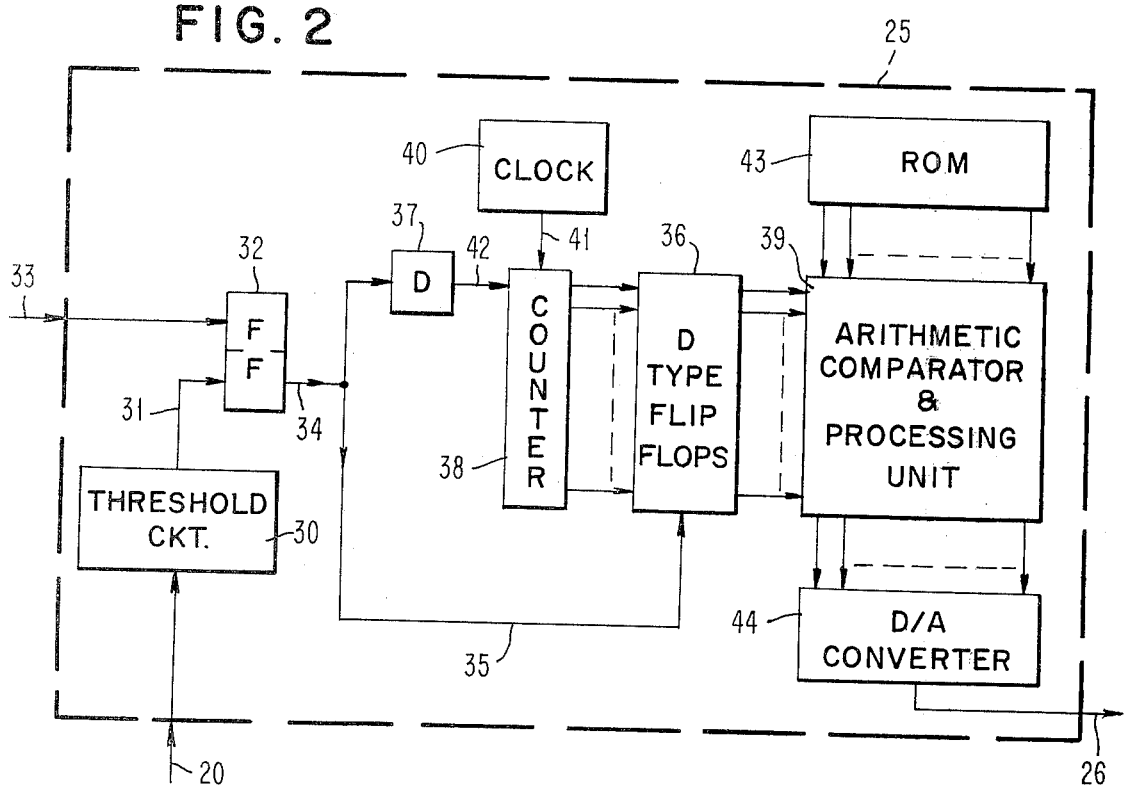
FIG. 2 is a schematic block diagram of the logic circuit of FIG. 1.

As shown in FIG. 2, the logic circuit 25 includes a threshold circuit 30, which receives a pulse from the photodetector 19 over the output line 20 each time that the LED 15 is strobed. Whenever there is no blocking of either of the apertures 17 and 18 by any of the droplets 14, the output pulse of the photodetector 19 is at its peak. However, when either of the apertures 17 and 18 of the grid 16 is blocked by one of the droplets 14 when the LED 15 is strobed on, then a half peak pulse is produced from the photodetector 19 on the output line 20 since one of the apertures 17 and 18 is still transmitting light to the photodetector 19.

The threshold circuit 30 provides a positive pulse on its output line 31 whenever its threshold level is crossed. This occurs whenever the peak pulse is produced from the photodetector 19 due to neither of the apertures 17 and 18 of the grid 16 being blocked by one of the droplets 14 when the LED 15 is strobed on. However, when either of the apertures 17 and 18 in the grid 16 is blocked by one of the droplets 14 when the LED 15 is strobed on, the half peak pulse from the photodetector 19 does not have sufficient amplitude to cross the threshold level of the threshold circuit 30. Accordingly, no pulse appears on the output line 31 of the threshold circuit 30. Thus, the threshold circuit 30 produces output pulses on the output line 31 only when the apertures 17 and 18 are not blocked by one of the droplets 14 at the time that the LED 15 is strobed on.

The output line 31 of the threshold circuit 30 is supplied to a flip flop 32 as one of the inputs thereto. One suitable example of the flip flop 32 is a JK flip flop. The other input to the flip flop 32 is a line 33, which receives a positive pulse from the square wave modulator 21 each time that the LED 15 is strobed on.

Thus, each time that the LED 15 is strobed on and neither of the apertures 17 and 18 in the grid 16 is blocked by one of the droplets 14, the flip flop 32 receives two positive or high pulses. As a result, the flip flop 32 has a low output pulse on its output line 34. The flip flop 32 does not change state when both of its outputs go down.

When one of the apertures 17 and 18 in the grid 16 is blocked by one of the droplets 14 so that the output line 31 of the threshold circuit 30 has a low or zero output, then the flip flop 32 has a positive or high output on the output line 34. Thus, this high pulse on the output line 34 of the flip flop 32 indicates that one of the apertures 17 and 18 has been blocked by one of the droplets 14 at the time that the LED 15 is strobed on.

The output line 34 is connected by a line 35 to D-type flip flops 36. The output line 34 also is connected to a delay circuit 37.

The activation of the D-type flip flops 36 by the positive pulse from the flip flop 32 transfers the count in a counter 38 to an arithmetic comparator and processing unit 39. The counter 38 continuously receives pulses from a clock 40 through a line 41 so that the counter 38 counts the number of pulses from the clock 40 between each time that the counter 38 is reset by the positive pulse supplied from the delay circuit 37 through a line 42. Thus, the delay circuit 37 enables the D-type flip flops 36 to transfer the output of the counter 38 to the arithmetic comparator and processing unit 39 before the counter 38 is again reset to zero.

The count from the counter 38 is a measurement of the drift velocity since it counts the time between the blocking of each of the apertures 17 and 18 in the grid 16. The count from the counter 38 is compared in the arithmetic comparator and processing unit 39 with a count from a storage register such as a read only memory 43, for example. The read only memory 43 has the count for the drift velocity when the droplets 14 are at the desired velocity.

The time between each pair of the pulses over the line 42 is given by either $$t_a = \frac{D}{V_d} \quad (3)$$

or $$t_b = \frac{w - D}{V_d} \quad (4)$$

where $t_a$ is considered the time between blocking of the aperture 17 by one of the droplets 14 with the LED 15 is strobed on and blocking of the aperture 18 by one of the droplets 14 with the LED 15 strobed on, $t_b$ is the time between when the aperture 18 is blocked by one of the droplets 14 with the LED 15 strobed on and the aperture 17 is blocked by one of the droplets 14 with the LED 15 strobed on, and $D$, $V_d$, and $w$ have been previously defined.

If $D = 0.9w'$ is the design wavelength of the droplet 14 when the droplet 14 is at the design velocity, then from equation (3)

$$t_a = \frac{0.9w'}{V_d}$$

and from equation (4)

$$t_b = \frac{w - 0.9w'}{V_d}$$

so that $t_b$ is approximately equal to $$\frac{0.1w'}{V_d}$$

Therefore if C is considered the frequency of the clock and $N_a$ is the number of counts during $t_a$, then $$N_a = \frac{0.9w'C}{V_d}. \quad (5)$$

If $N_b$ is considered to be the number of counts during the time $t_b$, then $$N_b = \frac{0.1w'C}{V_d}. \quad (6)$$

Accordingly, in view of the large difference between $N_a$ and $N_b$, the logic of the arithmetic comparator and processing unit 39 will ignore any count from the counter 38 similar to $N_b$ and utilize only those counts having a number near $N_a$ insofar as comparing with the count in the read only memory 43.

When the arithmetic comparator and processing unit 39 receives a count near $N_a$, the count from the read only memory 43 is compared in the logic of the arithmetic comparator and processing unit 39, and an output is supplied from the arithmetic comparator and processing unit 39 to a digital to analog converter (DAC) 44. The output of the DAC 44 is supplied over the output line 26 of the logic circuit 25 to the pressure regulator 27 to change the pressure in the manifold 10. The arithmetic comparator and the processing unit 39 produces a signal in accordance with the count from the counter 38 to shift the pressure in the correct direction. That is, if the velocity of the droplets 14 has decreased, then the pressure is increased and vice versa.

As the distance D is increased towards the design wavelength $w'$ of the droplets 14, a larger period of time is obtained for counting. Thus, this enables counting of the very high velocity of the liquid stream with relatively low speed counting circuits. The counting circuits can operate at a speed of about 1/100 of the frequency at which the droplets 14 are passing the apertures 17 and 18, for example.

Instead of using the arihtmetic comparator and processing unit 39 to use only the count produced by $N_a$, the ratio of the counts produced in the time period $t_a$ to $t_b$ can be employed. Thus, from equation (4)

$$t_b = \frac{w - D}{V_d}$$

and from equation (3)

$$t_a = \frac{D}{V_d}$$

so that $$\frac{t_a}{t_b} = \frac{D}{w - D}.$$

Accordingly, if $D = 0.9w'$, for example, then the ratio of $N_a$ to $N_b$ would be approximately nine since $w$ and $w'$ are approximately equal. Of course, the arithmetic comparator and processing unit 39 would have to contain circuits to compare the ratio in the current order.

If the distance D between the apertures 17 and 18 is made equal to $(w'/2$, than $$t_a = \frac{w'}{2 V_d} \quad (7)$$

and $$t_b = \frac{w - \frac{w'}{2}}{V_d} \qquad (8)$$

with $w$ being the actual wavelength of the droplets 14 and $w'$ being the design wavelength when the velocity V of the droplets 14 is at the design or desired velocity. If the velocity of the droplets 14 is at the design of desired velocity, than $t_a$ and $t_b$ are equal since the substitution of $w'$ for $w$ results in $$t_a = t_b = \frac{w'}{2V_d}$$

However, if the velocity V is not at its design or desired velocity, $w$ also changes so that it is not equal to $w'$. Accordingly, $t_a$ and $t_b$ are not equal so that the count of clock pulses for each of these time periods would be different.

From equation (2), $$V_d = -\frac{V(df)}{f_2}.$$

Thus, replacing $V_d$ in equations (7) and (8) and ignoring the negative sign results in $$t_a = \frac{w'f_2}{2V(df)}$$

and $$t_b = \frac{wf_2}{V(df)} - \frac{w'f_2}{2V(df)}.$$

Since $V = f_1 w$ from equation (1), then $$t_a = \frac{w'f_2}{2wf_1(df)}$$

and $$t_b = \frac{wf_2}{wf_1(df)} - \frac{w'f_2}{2wf_1(df)}.$$

Since $f_1$ and $f_2$ are approximately equal, $$t_a = \frac{w'}{2w(df)}$$

and $$t_b = \frac{1}{(df)} - \frac{w'}{2w(df)}.$$

Accordingly, the arithmetic comparator and processing unit 39 could contain circuitry to compare each count from the counter 38 with the prior count. In this arrangement, the read only memory 43 would be replaced by a memory to store the prior count.

The arithmetic comparator and processing unit 39 would include means to subtract each of the counts from the prior count and use the result to control pressure through the pressure regulator 27. Actually, the second count would be compared with the first count. If it exceeded the first count, than the arithmetic comparator and processing unit 39 would produce a signal to change the pressure in one direction. Than, the count after the pressure has been changed would be compared with the count prior to the change. If the difference in the count increased, then the output of the arithmetic comparator and processing unit 39 would be reversed to change the pressure in the opposite direction. If the count decreased, then the arithmetic comparator and processing unit 39 would supply a further output in the same direction to further change the pressure in the same direction.

Referring to FIG. 3, there is shown another embodiment of the present invention in which the LED 15 is connected to an oscillator 50 through a phase shifter 51. The oscillator 50 produces the same frequency for both the transducer 12 and the LED 15.

In this embodiment, the apertures 17 and 18 is the grid 16 are spaced from each other the desired wavelength, $w'$, of the droplets 14. Thus, $D = w'$.

The aperture 17 has a photodetector 52 disposed therebehind, and the aperture 18 has a photodetector 53 disposed therebehind. Thus, in this embodiment of the present invention, the apertures 17 and 18 have separate photodetectors.

The photodetector 52 is connected by a line 54 to a flip flop 55 while the photodetector 53 is connected by a line 56 to a flip flop 57. The output of the flip flop 55 is connected to a counter 58, which is the same as the counter 38 of FIG. 2 and has a clock 59 connected thereto. The output of the flip flop 57 is connected to D-type flip flops 60, which are the same as the flip flops 36 in FIG. 2.

Whenever there is a positive pulse from the output of the flip flop 55, the counter 58 is reset. Whenever there is an output from the flip flop 57, the flip flops 60 transmit the count of the counter 58 to an arithmetic comparator and processing unit 61, which has a storage register such as a read only memory 62, for example, connected thereto.

The output of the arithmetic comparator and processing unit 61 is connected through a digital to analog converter (DAC) 63 to the pressure regulator 27. The pressure regulator 27 changes the pressure of the stream to change its velocity.

The phase shifter 51 is continuously driven by pulses from the clock 59. This results in the phase of the frequency of the LED 15 relative to the oscillator 50 being shifted linearly and having 360° of continuous phase scan.

If the droplets 14 are moving at a velocity slightly less than the design velocity, than $w$, the actual wavelength of the droplets 14, is less than $w'$, the design wavelength. Accordingly, one of the droplets 14 will block the aperture 17 and the droplet ahead of the droplet, which is blocking the aperture 17, will block the aperture 18 shortly thereafter. This is because the second of the two droplets 14 will be between the two apertures 17 and 18 since their distances are less than the design wavelength.

The photodetector 52 provides no input pulse to the flip flop 55 when the LED 15 is strobed on and the aperture 17 is blocked. Accordingly, no positive pulse is supplied to the flip flop 55 at this time as occurs whenever the aperture 17 is not blocked and the LED 15 is strobed on. The flip flop 55 also receives an input over a line 65 from the oscillator 50.

In the same manner as the flip flop 32 functions, the flip flop 55 produces a low on its output line 66 unless the input on the line 54 is low when the input on the line 65 is high. When this occurs, a positive pulse occurs on the output line 66 of the flip flop 55 to indicate that the aperture 17 has been blocked by one of the droplets 14. This positive pulse resets the counter 58 to cause it to start counting the pulses from the clock 59.

When the aperture 18 is blocked by the droplet 14, which was ahead of the droplet 14 blocking the aperture 17, the photodetector 53 does not transmit a signal over the line 56 to the flip flop 57. The flip flop 57 also is connected by a line 67 to the oscillator 50 so that the pulses supplied from the oscillator 50 are supplied to the flip flop 57.

Therefore, when the photodetector 53 is receiving no light and the LED 15 is strobed on, the output of the flip flop 57 on its output line 68 is positive in the same manner as described for the flip flop 55. When this positive pulse occurs on the output line 68, the D-type flip flops 60 transfer the count in the counter 58 to the arithmetic comparator and processing unit 61. This count is compared with a count in the read only memory 62. Since the count will be less than that required for the design velocity, the signal from the arithmetic comparator and processing unit to the DAC 63 will cause the output of the DAC 63 to control the pressure regulator 27 to increase the pressure whereby the velocity is increased.

If the wavelength $w$ of the droplets 14 is greater than the design wavelength $w'$, than one of the droplets 14 will block the aperture 17. Near the end of 360° of shifting the phase of the frequency of the LED with respect to the frequency of the oscillator 50, which is producing the frequency of the transducer 12, the same droplet 14, which blocks the aperture 17, will block the aperture 18. As a result, the counter 58 will start to count when the aperture 17 is blocked by the droplet 14, and the count will be transferred to the arithmetic comparator and processing unit 61 when the same droplet 14 blocks the aperture 18. Thus, a high count is obtained. This is compared with the count in the read only memory 62 and provides an output to the DAC 63. The DAC 63 produces an output of the pressure regulator 27 to reduce the pressure so that the velocity of the droplets 14 is reduced.

If the wavelength $w$ of the droplets 14 is equal to the design wavelength $w'$, then both of the apertures 17 and 18 will be blocked simultaneously by two of the droplets 14. If this were to occur, there would be no output from the flip flops 60 to the arithmetic comparator and processing unit 61 since the reset pulse to the counter 58 from the flip flop 55 would cause the counter 58 to start to count but the pulse from the flip flop 57 would arrive at the D-type flip flops 60 at the same time to automatically transfer the zero count to the arithmetic comparator and processing unit 61.

Thus, the absence of a count would result in the DAC 63 not changing its output since the droplets 14 would be moving at the design velocity.

If desired, a signal delay could be provided in the output of the flip flop 55 to the counter 58. This delay could be in nanoseconds, for example, when the time period of a pulse from the oscillator 50 was in milliseconds. This slight delay would result in a large count being supplied to the arithmetic comparator and processing unit 61 since the counter 58 would not be reset to start to count pulses from the clock 59 until after the D-type flip flops 60 have been activated by the flip flop 57. Thus, the D-type flip flops 60 would be transferring count at the start of the next cycle so that this would be a very large count. When this occurs, the arithmetic comparator and processing unit 61 would recognize this large signal in comparison with the count in the read only memory 62 as indicating that the droplets 14 were moving at the design velocity and not produce any change in the output to the DAC 63.

This slight delay would not affect the magnitude of the count when the velocity of the droplet 14 was greater or less than that desired. In these situations, the slight delay of less than the time period for one of the pulses from the oscillator 50 would have no significant effect on the mangitude of the count.

While the apertures 17 and 18 have been described as being disposed a wavelength from each other so that $D = w$, it should be understood that the distance D may be any integral of the wavelength $w$. It is only necessary that both of the apertures 17 and 18 be blocked at the same time to indicate that the velocity of the droplet 14 is at the desired or design velocity.

While the present invention has shown and described the LED 15 as being a single light source, it should be understood that separate LEDs can be utilized for each of the apertures 17 and 18. Furthermore, the light source can be other than an LED.

An advantage of this invention is that counting circuits, which are relatively slow in comparison with the velocity of the droplets, can be employed. Another advantage of this invention is that the velocity of the droplets can be determined irrespective of the type of ink jet printing.

While the invention has been particularly shown and described with reference to preferred embodiments thereof, it will be understood by those skilled in the art that various changes in form and details may be made therein without departing from the spirit and scope of the invention.

What is claimed is:

1. A device for detecting the velocity of droplets formed from a liquid stream including:
   means forming a pair of apertures spaced from each other a fixed distance related to the design wavelength of the droplets, said apertures being disposed on one side of the path of the droplets;
   light source means directed toward said apertures and disposed on the opposite side of the path of the droplets;
   means to strobe said light source means at a selected frequency related to the frequency of generation of the droplets;
   first means to detect when a droplet blocks each of said apertures;
   and second means to detect the velocity of the droplets in accordance with when each of said apertures is blocked and the selected frequency of said strobing means.

2. The device according to claim 1 in which:
said apertures are spaced from each other less than the design wavelength of the droplets;
and said strobing means strobes said light source means at a frequency different than the frequency of generation of the droplets from the liquid stream.

3. The device according to claim 2 in which said second detecting means includes:
means to count the time between when one of said apertures is blocked and when the other of said apertures is blocked;
and means to utilize the output of said counting means to detect if the velocity of the droplets is at the desired velocity.

4. The device according to claim 1 in which:
said apertures are spaced from each other a distance equal to the design wavelength of the droplets;
said strobing means said light source means at the frequency at which the droplets are generated from the liquid stream;
and said second detecting means includes means to detect when both of said apertures are blocked simultaneously to detect the design velocity of the droplets for the design wavelength.

5. The device according to claim 4 including:
means to adjust the phases of the frequencies of said strobing means and the generation of the droplets relative to each other;
and means to adjust the velocity of the droplets until both of said apertures are blocked simultaneously during strobing of said light source means.

6. The device according to claim 1 in which:
said apertures are spaced from each other a distance equal to an integral of the design wavelength of the droplets;
said strobing means strobes said light source means at the frequency at which the droplets are generated from the liquid stream;
and said second detecting means includes means to detect when both of said apertures are blocked simultaneously to detect the design velocity of the droplets for the design wavelength.

7. The device according to claim 6 including:
means to adjust the phases of the frequencies of said strobing means and the generation of the droplets relative to each other;
and means to adjust the velocity of the droplets until both of said apertures are blocked simultaneously during strobing of said light source means.

8. A method of detecting the velocity of droplets formed from a liquid stream including:
directing the droplets along a path between light source means and a pair of apertures;
spacing the apertures from each other a fixed distance related to the design wavelength of the droplets;
strobing the light source means at a selected frequency related to the frequency of generation of the droplets;
detecting when a droplet blocks each of the apertures;
and detecting the velocity of the droplets in accordance with when each of the apertures is blocked and the selected strobe frequency.

9. The method according to claim 8 including:
spacing the apertures from each other less than the design wavelength of the droplets;
and strobing the light source means at a frequency different than the frequency of generation of the droplets from the liquid stream.

10. The method according to claim 9 including:
counting the time between when one of the apertures is blocked and when the other of the apertures is blocked;
and utilizing the counted time to detect if the velocity of the droplets is at the desired velocity, 11. The method according to claim 8 including:
spacing the apertures from each other the design wavelength of the droplets;
strobing the light source means at the frequency of generation of the droplets from the liquid stream;
and detecting when both of the apertures are simultaneously blocked to detect the desired velocity of the droplets.

12. The method according to claim 11 including:
adjusting the phase of the frequencies of strobing the light source and generation of the droplets relative to each other;
and adjusting the velocity of the droplets until both of the apertures are blocked simultaneously during strobing of the light source means.

13. The method according to claim 8 including:
spacing the apertures from each other an integral of the design wavelength of the droplets;
strobing the light source means at the frequency of generation of the droplets from the liquid stream;
and detecting when both of the apertures are simultaneously blocked to detect the desired velocity of the droplets.

14. The method according to claim 13 including:
adjusting the phase of the frequencies of strobing the light source and generation of the droplets relative to each other;
and adjusting the velocity of the droplets until both of the apertures are blocked simultaneously during strobing of the light source means.

* * * * *